United States Patent
Gragnic et al.

(10) Patent No.: US 10,320,066 B2
(45) Date of Patent: Jun. 11, 2019

(54) ANTENNA CARRIER INTENDED FOR BEING BUILT INTO AN ELECTRONIC DOCUMENT

(71) Applicant: IDEMIA FRANCE, Colombes (FR)

(72) Inventors: Elodie Gragnic, Colombes (FR); Olivier Bosquet, Colombes (FR)

(73) Assignee: IDEMIA FRANCE, Colombes (FR)

( * ) Notice: Subject to any disclaimer, the term of this patent is extended or adjusted under 35 U.S.C. 154(b) by 331 days.

(21) Appl. No.: 15/322,592

(22) PCT Filed: Jun. 30, 2015

(86) PCT No.: PCT/FR2015/051783
§ 371 (c)(1),
(2) Date: Mar. 13, 2017

(87) PCT Pub. No.: WO2016/001569
PCT Pub. Date: Jan. 7, 2016

(65) Prior Publication Data
US 2017/0155189 A1    Jun. 1, 2017

(30) Foreign Application Priority Data
Jul. 1, 2014  (FR) ..................... 14 56270

(51) Int. Cl.
*H01Q 1/12*    (2006.01)
*H01Q 1/38*    (2006.01)
(Continued)

(52) U.S. Cl.
CPC ........... *H01Q 1/38* (2013.01); *G06K 19/0775* (2013.01); *G06K 19/07722* (2013.01);
(Continued)

(58) Field of Classification Search
CPC .......... H01Q 1/38; H01Q 1/2216; H01Q 7/00; H01Q 1/22; H01Q 1/00; H01Q 1/36;
(Continued)

(56) References Cited

U.S. PATENT DOCUMENTS 6,161,761 A * 12/2000 Ghaem ............ G06K 19/07749
                                                  235/380
6,233,818 B1  5/2001 Finn et al.
(Continued)

FOREIGN PATENT DOCUMENTS

| CN | 1795456 A | 6/2006 |
| EP | 1628244 A1 | 2/2006 |

(Continued)

OTHER PUBLICATIONS

International Search Report dated Nov. 12, 2015, International Application No. PCT/FR2015/051783, pp. 1-5 (including English Translation).

(Continued)

*Primary Examiner* — Angel R Estrada
(74) *Attorney, Agent, or Firm* — MH2 Technology Law Group, LLP

(57) ABSTRACT

Disclosed is an antenna support for incorporating in an electronic document. The support can include a first substrate made of a plastics material that is defined by first and second opposite faces, which define between them a thickness of the substrate. The antenna can include one or more turn that extends between two ends, and the antenna can be formed by a wire that is inlaid in the thickness of the first substrate from the first face, such that each of the two ends presents a zigzag shape formed by at least two rectilinear portions and by two bends. The bends can be inlaid more deeply than the rectilinear portions in the thickness of the first substrate from the first face.

13 Claims, 2 Drawing Sheets

(51) Int. Cl.
*G06K 19/077* (2006.01)
*H01Q 1/22* (2006.01)
*H01Q 7/00* (2006.01)

(52) U.S. Cl.
CPC . *G06K 19/07749* (2013.01); *G06K 19/07754* (2013.01); *H01Q 1/2216* (2013.01); *H01Q 7/00* (2013.01)

(58) Field of Classification Search
CPC ............... H01Q 1/12; G06K 19/07722; G06K 19/07749; G06K 19/0775; G06K 19/00754
USPC ............ 174/153 A, 137, 138 R, 152 A, 255; 361/736, 737, 748, 749; 235/492
See application file for complete search history.

(56) References Cited

U.S. PATENT DOCUMENTS

| | | | |
|---|---|---|---|
| 6,320,753 B1* | 11/2001 | Launay | G06K 19/077 174/255 |
| 7,404,522 B2 | 7/2008 | Kawai | |
| 8,102,021 B2* | 1/2012 | Degani | G06K 19/07749 257/532 |
| 9,342,779 B2* | 5/2016 | Zhang | G06K 19/07754 |
| 10,115,050 B2* | 10/2018 | Gragnic | G06K 19/07754 |
| 2007/0271467 A1 | 11/2007 | Ayala et al. | |
| 2009/0278690 A1 | 11/2009 | Degani | |
| 2010/0200661 A1* | 8/2010 | Shafran | G06K 19/07745 235/492 |
| 2013/0075134 A1 | 3/2013 | Finn | |
| 2015/0090799 A1 | 4/2015 | Zhang | |
| 2016/0224882 A1* | 8/2016 | Zhang | G06K 19/0723 |

FOREIGN PATENT DOCUMENTS

| | | |
|---|---|---|
| EP | 1021792 B1 | 3/2008 |
| EP | 2637129 A2 | 9/2013 |
| WO | 2013/063870 A1 | 5/2013 |

OTHER PUBLICATIONS

Chinese Office Action dated Sep. 21, 2018 in corresponding CN Application No. 201580045354.0, 6 pages.

* cited by examiner

ANTENNA CARRIER INTENDED FOR BEING BUILT INTO AN ELECTRONIC DOCUMENT

CROSS-REFERENCE TO RELATED APPLICATIONS

This application is a U.S. National Stage application of International Application No. PCT/FR2015/051783 filed 30 Jun. 2015, which claims priority to French Application No. 1456270 filed 1 Jul. 2014.

The invention relates to an antenna support, also referred to as an "inlay", and to electronic documents such as identity documents or cards incorporating such supports.

More particularly, the invention relates to an antenna support comprising: a first substrate made of plastics material, being defined by first and second opposite faces defining between them a thickness of the substrate; and the antenna comprising at least one turn that extends between two ends, the antenna being formed by a wire that is inlaid in the thickness of the first substrate from the first face, each of the two ends presenting a zigzag shape formed by at least two rectilinear portions and by two bends.

The prior art discloses antenna supports for inserting in an electronic document such as a smartcard. Antenna supports, also referred to as "inlays", are conventionally fabricated using an ultrasound method such as that described in Documents U.S. Pat. No. 6,233,818 and EP 0 880 754. That method consists in extending a conductive metal wire over a substrate by using a tool, such as a sonotrode, that moves over the substrate while dispensing the wire. The wire is inlaid in the substrate by means of ultrasound vibrations transmitted from the tool to the wire. The vibrations are transmitted perpendicularly to the substrate in order to inlay the wire in the thickness of the substrate. Preferably, the wire is surrounded by a sheath that is heated for a length of time that is very short, thereby improving the adhesion of the sheath surrounding the wire in the substrate.

The tool is controlled from control means serving to define the path along which the wire is laid. It is thus possible to wind the wire as a plurality of turns and/or to lay it with a variety of shapes, such as a zigzag or a sinuous shape. A zigzag or sinuous shape comprises a sinuous line presenting curves alternating in opposite directions. More particularly, a zigzag shape comprises an alternation of rectilinear portions and of bends. Such a shape is shown in Document EP 1 021 792, which describes a smartcard in which the ends of the antenna are of zigzag shape. These ends are for being electrically connected to a microcircuit mounted in the card in order to enable the card to operate without contact with a remote reader.

Nevertheless, it has been found that laying a wire with a zigzag shape reduces the ability of the wire to adhere to the substrate. In particular, the bends of the zigzag present lower adhesion than the rectilinear portions and they tend to straighten out because of the mechanical stresses due to the bending or to the traction exerted by the tool while laying the following rectilinear portion. The bends thus present a higher risk of the wire being pulled out and broken, in particular while antenna supports are being manipulated and transported. These drawbacks thus lead to a higher rate of electrical disconnection between the antenna and a microcircuit of an electronic document, thus making the electronic document invalid.

Solutions have therefore been sought to improve the retention of the bends in the substrate of the antenna support.

For this purpose, the invention proposes an antenna support for incorporating in an electronic document, in which the bends are inlaid more deeply than the rectilinear portions in the thickness of the first substrate going from the first face.

By means of these provisions, the bends are inlaid more deeply in the thickness of the material constituting the substrate, and consequently they are held by a greater quantity of material coating them.

The invention also provides an electronic document including an antenna support and a second substrate assembled to the first substrate so that the antenna is trapped between the two substrates, an open cavity having a bottom in which at least a machined section of a rectilinear portion forming the antenna ends is apparent, electrical connection means covering at least part of the machined sections of the antenna wire, a microcircuit module embedded in the cavity and electrically in contact with the machined sections via the connection means.

By means of these provisions, the bends are sunk into the material constituting the substrate. The bends are thus not only held by the material of the substrate, but they are also situated below the machining plane, and they are therefore not exposed to the cutter tool. These provisions considerably reduce any risk of the bends being torn out.

According to other characteristics:

the bends are inlaid to a depth of not less than 20 micrometers (µm) relative to the rectilinear portions;

the electrical connection means comprise an anisotropic adhesive covering the machined sections of the rectilinear portions;

the cavity is formed by a first spot face and a secondary spot face made in the first spot face, the machined sections being apparent in the bottom of the first spot face.

The invention also provides a method of fabricating an antenna support that includes at least a step of inlaying the wire antenna in the first substrate by means of a tool adapted to dispense and inlay the wire, the tool moving at a speed relative to the substrate, the speed v1 at which the bends are laid being no more than 0.75 times the speed v2 at which the rectilinear portions are laid.

According to other characteristics:

the method includes at least a step of inlaying the wire antenna in the first substrate by means of a tool adapted to dispense and inlay the wire and that exerts a bearing force against the first substrate, the bearing force applied for laying the bends being not less than 1.25 times the force applied for laying the rectilinear portions;

the method includes at least a step of inlaying the wire antenna in the first substrate by means of a tool adapted to dispense and inlay the wire by ultrasound at a determined frequency, the frequency applied for laying the bends being not less than 1.25 times the frequency applied for laying the rectilinear portions;

the rectilinear portions are spaced apart from one another at a gap of not less than the diameter of the antenna wire;

the method of fabricating an electronic document comprises the following steps: fabricating an antenna support, assembling at least one second substrate by a lamination step; machining an open cavity presenting a depth such that a machined section of a rectilinear portion is apparent in the bottom of the cavity; and placing the microcircuit module in the cavity and making an electrical connection between the module and the ends of the antenna;

the machining is performed in such a manner that the machined section of a rectilinear portion presents a width lying in the range 0.4 times to 0.6 times the diameter of the antenna wire; and the fabrication method includes a step of depositing an anisotropic adhesive between the module and the bottom of the cavity prior to the step of putting the microcircuit module into place, followed by a step of pressing the module into the cavity in order to bond the module in the cavity and activate the electrical connection.

The present invention can be better understood on reading the following detailed description made with reference to the accompanying drawings, in which.

Figure 4:
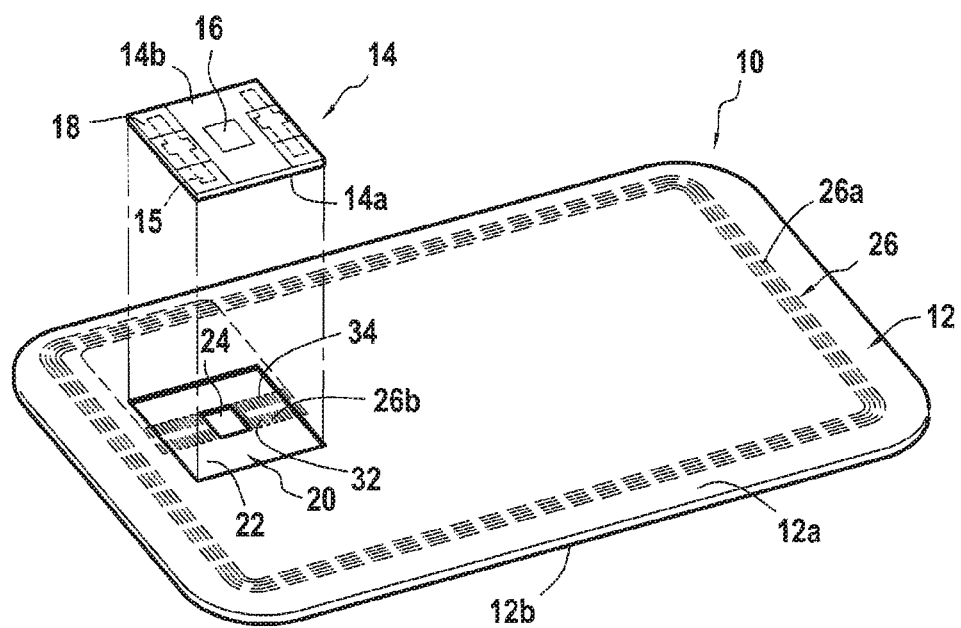
FIG. 4 is a perspective view of a smartcard including an antenna support of the invention.

A smartcard 10 as shown in FIG. 4 comprises a body 12 of plastics material defined between a front face 12a and a rear face 12b. The body 12 is a thin plastics plate. The dimensions of cards are specified in the standards ISO7810 and ISO7816, and they present the following values: 85 millimeters (mm)×54 mm×0.76 mm. The thickness is negligible compared with the length and width dimensions.

Such a body 12 may be made by any means. One conventional means comprises hot lamination of layers of plastics material. The layers perform various functions. Thus, a central internal layer or substrate may be a structural layer conferring stiffness to the body 12 and to the card 10 or serving to support an electronic component. Intermediate layers, on either side of the substrate, may carry inscriptions or decorations having an informative or decorative function. Outer layers, advantageously transparent layers, typically terminate the stack and provide surface protection for the layers that are further in.

The card 10 also has a microcircuit module 14 that is formed by a thin printed circuit plate. The printed circuit plate presents an inside face 14a having a chip 16 or microcircuit mounted thereon. The outer face 14b of the printed circuit plate has metallized contact surfaces 18 that are connected firstly to the microcircuit and that intend secondly to come into contact with the pins of an external reader. The metallized contact surfaces 18 thus enable the card 10 to communicate with an external terminal by physical contact. In addition, the inside face 14a of the module 14 carries connection pads 15 that are connected to the microcircuit and that are for connecting electrically to an electronic component arranged in the body 12 of the card 10.

An open cavity 20 is made in the body 12 of the card 10 and it opens out into the front face 12a of the card 10. The card 10 receives the microcircuit module 14. This cavity 20 has a first spot face 22 and a secondary spot face 24 that is made in the first spot face 22 and that serves to leave room for the microcircuit.

So-called "dual" cards are also known that are adapted to communicate with external readers by physical contact via pins as described above, or remotely, without physical contact, by means of an antenna 26. Such cards then incorporate such an antenna 26 in the card body 12. For this purpose, an antenna support 28 forms an internal layer of the card 10 and is inserted between the other layers prior to the lamination operation. The antenna support 28 is constituted by a substrate 30 made of plastics material, such as polyethylene terephthalate (PET), polyvinyl chloride (PVC), or polycarbonate, being defined by two opposite faces 30a and 30b that define between them the thickness of the substrate 30. An antenna-forming wire 26 is unwound on and inlaid in the antenna support 28, and then the support is covered by the other layers and subsequently laminated together therewith.

Figure 1:
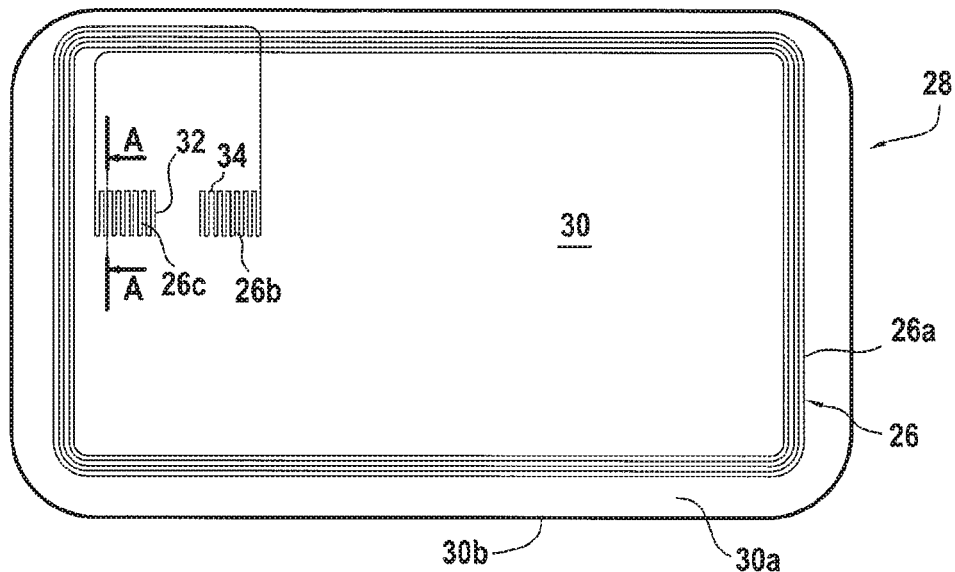
FIG. 1 is an elevation view of an antenna support of the invention.

The antenna 26 constitutes a winding. It has at least one turn 26a and two ends 26b and 26c between which the turn 26a extends. The ends 26b and 26c of the antenna 26 have respective zigzag shapes, each formed by at least two rectilinear portions 32 and two bends 34 as can be seen in FIGS. 1 and 4. The antenna wire 26 is inlaid in the thickness of the first substrate 30 from a first face 30a so that the rectilinear portions 32 extend substantially in the same plane, i.e., in section, in a plane perpendicular to the plane of the substrate 30, the rectilinear portions 32 extending along straight lines parallel to the plane of the support.

In order to improve retention of the bends 34 and reduce considerably any risk of them being pulled out during the machining step, the invention proposes an antenna support 28 in which the bends 34 are inlaid more deeply than the rectilinear portions 32 in the thickness of the antenna support 28 going from the first face 30a.

Figure 2A:
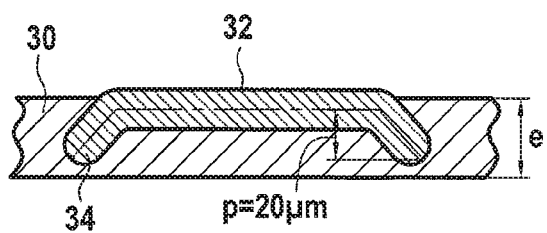
FIG. 2a is a section view on A-A of the antenna support shown in FIG. 1.
Figure 2B:
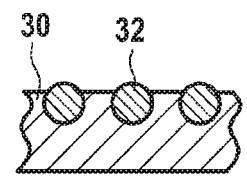
FIG. 2b is a section view on a plane perpendicular to the plane A-A.

For this purpose, the bends 34 are inlaid to a depth p of about 20 μm at least relative to the rectilinear portions 32 from the first face 30a. However this value may be modified depending on the thickness of the support and the initial diameter of the wire. The offset of 20 μm is estimated between the respective center axes of a rectilinear portion and of a bend, as can be seen in FIG. 2a. The greater the initial diameter of the antenna-forming wire, the greater the possible offset. By means of these provisions, the bends 34 are protected by the material of the substrate 30 in which they are inserted. As a result, any risk of the ends 26b and 26c of the antenna 26 being pulled out are greatly reduced compared with prior art solutions.

Preparing the open cavity 20 by machining in order to receive a module 14 reveals the rectilinear portions 32 of the contact ends 26b, 26c. The machining serves to make the cavity 20, and the depth of the cavity 20 is determined so that the rectilinear portions 32 are apparent with the bottom of the cavity 20. Furthermore, and advantageously, this operation serves to clean the rectilinear portions 32 at the surface so as to remove any insulating material such as an enamel or a sheath. By means of the provisions of the present invention, the cutter serves to machine the rectilinear portions 32 in a machining plane that is situated above the plane of the bends 34.

In a preferred embodiment, the cavity 20 has two spot faces 22 and 24 and machined sections 31 of the rectilinear portions 32 are apparent in said first spot face 22, being flush with the bottom of the first spot face 22, which corresponds to the surface on which the module 14 comes to bear. The ends 26b, 26c of the antenna 26 are electrically connected to the microcircuit by means of connection pads 15 arranged on the inside face 14a of the module 14. The machined sections 31 of the rectilinear portions 32 and the connection pad connected to the chip 16 of the module 14 are arranged facing each other so as to obtain a large electrical connection area.

The ends 26b, 26c of the antenna 26 are thus accessible at least in part in order to provide an electrical connection.

In order to guarantee good electrical connection between the module 14 and the ends 26b and 26c of the antenna 26, it is preferable to have sufficient contact area between the ends 26b, 26c of the antenna 26 and the connection pad of the module 14. This sufficient contact area is determined by the area of the machined wire that is accessible from the bottom of the first spot face 22.

The quantity of wire that is deposited depends on the initial diameter of the wire. The gap of material between each rectilinear portion 34 depends on the diameter of the wire. In particular, the minimum gap between two rectilinear portions increases with increasing diameter of the wire, so as to clear a minimum area of the plastics substrate 30 used for bonding the module 14. Preferably, the minimum gap is not less than the diameter of the antenna wire 26.

The antenna support 28 is made using a method known in the prior art and described briefly in the introduction of the present description. The method is performed by a tool having means for dispensing the antenna wire and inlaying it in the substrate 30 of the antenna support 28. For this purpose, the tool has dispenser means such as a nozzle adapted to deliver the wire progressively onto the substrate 30. The tool also has control means for modifying the nozzle travel speed and wire dispensing speed parameters. Optionally, the tool includes control means for modifying the force that is applied while the wire is being laid. For this purpose, if the wire is laid by using a sonotrode, it may be envisaged to modify the frequency and the amplitude of the ultrasound vibrations. Specifically, the higher the frequency, the deeper the wire is pressed into the substrate. Advantageously, the returns are laid by using a sonotrode that is subjected to ultrasound at a frequency that is at least 1.25 times the frequency applied for the rectilinear portions. Finally, the tool may have heater means for applying local heating leading to a small amount of melting of the plastics material and/or of the sheath of the wire.

Thus, the method includes a step of inlaying the wire antenna in the first substrate 30 by means of the tool traveling at a speed relative to the substrate 30, the speed v1 at which the bends 34 are laid being not more than 0.75 times the speed v2 at which the rectilinear portions 32 are laid. Preferably the speed v1 lies in the range 0.3 times to 0.5 times the speed v2. Because of the tool slowing down while laying the wire, the bends 34 present an inlaying time that is longer, thereby having the effect of positioning the bends more deeply than the rectilinear portions 32.

In a variant embodiment, the fabrication method includes an inlaying step in which the bearing force applied against the first substrate 30 for laying the bends 34 is not less than 1.25 times the force applied for laying the rectilinear portions 32. These provisions guarantee that the bends 34 penetrate more deeply into the substrate 30. In a preferred embodiment, the parameters of the tool inlaying the wire in the substrate 30 are modified in order to slow down and exert a greater force while the bends 34 are being laid.

Figure 3A:
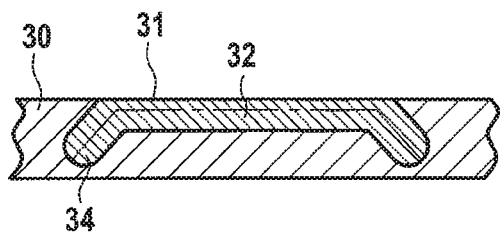
FIGS. 3a and 3b are views similar to the views of FIGS. 2a and 2b showing the rectilinear portions after machining.
Figure 3B:
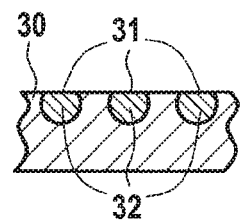

The rectilinear portions 32 are laid in the substrate 30 so as to be substantially in parallel alignment with one another and they are spaced apart at a minimum spacing. Furthermore, the rectilinear portions 32 are inlaid substantially in the same inlaying plane, which is itself parallel to the outside face 12a of the substrate 30. These provisions ensure that the rectilinear portions 32 are positioned at a constant depth so as to guarantee as large as possible a machining window. The depth of the cavity 20 is then selected so that the rectilinear portions 32 of the ends 26b and 26c of the antenna are brushed in a plane that is substantially parallel to the plane of the first substrate 30 so as to make at least one machined sections 31 of the rectilinear portions accessible. Side views of the machined sections 31 are given in FIGS. 3a and 3b. Advantageously, the machined section occupies a thickness lying in the range 10% to 40% of the diameter of the antenna-forming wire.

The invention also provides a method of fabricating an electronic document, such as a card 10 of bank card format or identity card format having dimensions as specified in the ISO7816 standards. The fabrication method consists in incorporating the above-described antenna support 28 in a body 12 of a card 10. For this purpose, the antenna support 28 is assembled with other layers made of plastics material, such as PET, PVC, or polycarbonate, by a hot laminating method that enables the various layers to be made to adhere to one another. The body 12 of the resulting card is then machined so as to form a cavity 20 that opens out into the front face 12a of the body 12 of the card 10. The machining depth is determined depending on the position of the ends 26b and 26c of the antenna in the thickness of the body 12 of the card 10. Most particularly, the depth of the cavity 20 is determined so that the rectilinear portions 32 of the ends 26b and 26c of the antenna are machined in part. Machined sections 31 of the rectilinear portions 32 are then accessible in order to be electrically connected to the contact pads of the module 14.

An anisotropic adhesive is then deposited on the bottom of the cavity 20 or on the inside face 14a of the module 14. This adhesive serves to hold the module 14 in place and it presents electrical conductivity properties so as to enable the electrical connection to be made between the machined sections 31 and the contact pads of the module 14.

The module 14 is then put into place in the cavity 20 so that the pads face the ends 26b and 26c of the antenna, and then the module 14 is embedded, i.e. put into place and compressed so as to cause the anisotropic adhesive to be conductive in one direction only.

The invention claimed is:

1. An antenna support for incorporating in an electronic document, the support comprising:
    a first substrate made of plastics material, being defined by a first face and a second face that is opposite the first face, defining therebetween a thickness of the first substrate; and
    an antenna comprising at least one turn that extends between two ends, the antenna being formed by a wire that is inlaid in the thickness of the first substrate from the first face, each of the two ends presenting a zigzag shape formed by at least two rectilinear portions and by two bends;
    wherein the two bends are inlaid more deeply than the two rectilinear portions in the thickness of the first substrate from the first face.

2. An antenna support according to claim 1, wherein the two bends are inlaid to a depth of not less than 20 μm relative to the at least two rectilinear portions.

3. An electronic document comprising:
    an antenna support according to claim 1, wherein the antenna support further comprises:
    a second substrate assembled to the first substrate such that the antenna is trapped between the first substrate and the second substrate;
    an cavity including a bottom in which at least a machined section of a rectilinear portion of the two ends of the antenna are apparent;

an electrical connection covering at least part of the machined section of the rectilinear portion of the two ends of the antenna; and a microcircuit module that is inserted and fastened in the cavity and that is in electrical contact with the machined section via the electrical connection.

4. An electronic document according to claim 3, wherein the electrical connection comprise an anisotropic adhesive covering the machined section of the rectilinear portion.

5. An electronic document according to claim 3, wherein the cavity is formed by a first spot face and a secondary spot face made in the first spot face, the machined section being apparent in the bottom of the first spot face.

6. A fabrication method for fabricating an electronic document according to claim 3, the method comprising:

fabricating an antenna support, the antenna support comprising:

a first substrate made of plastics material, being defined by a first face and a second face that is opposite the first face, defining therebetween a thickness of the first substrate; and an antenna comprising at least one turn that extends between two ends, the antenna being formed by a wire that is inlaid in the thickness of the first substrate from the first face, each of the two ends presenting a zigzag shape formed by at least two rectilinear portions and by two bends;

wherein the two bends are inlaid more deeply than the two rectilinear portions in the thickness of the first substrate from the first face; and wherein the antenna is inlaid in the first substrate by means of a tool adapted to dispense and inlay the wire;

assembling the second substrate to the first substrate using a lamination step;

machining the cavity to a depth such that the machined section of the rectilinear portion is apparent in the bottom of the cavity; and placing the microcircuit module in the cavity and making an electrical connection between the microcircuit module and the two ends of the antenna.

7. A fabrication method for fabricating an electronic document according to claim 6, wherein the machining is performed in such a manner that the machined section of the rectilinear portion presents a width lying in the range 0.4 times to 0.6 times the diameter of the wire.

8. A fabrication method according to claim 6 further comprising:

depositing an anisotropic adhesive between the microcircuit module and the bottom of the cavity prior to the step of placing the microcircuit module; and pressing the microcircuit module into the cavity in order to bond the microcircuit module in the cavity and activate the electrical connection.

9. A fabrication method for fabricating an antenna support according to claim 1, comprising:

inlaying the antenna in the first substrate by means of a tool adapted to dispense and inlay the wire.

10. A fabrication method according to claim 9, further comprising:

moving the tool at a speed relative to the first substrate such that the speed at which the two bends are laid is no more than 0.75 times the speed at which the at least two rectilinear portions are laid.

11. A fabrication method according to claim 9, wherein the tool exerts a bearing force against the first substrate, the bearing force applied for laying the two bends being not less than 1.25 times the bearing force applied for laying the at least two rectilinear portions.

12. A fabrication method according to claim 9, wherein the tool dispenses and inlays the wire by ultrasound at a determined frequency, the determined frequency applied for laying the two bends being not less than 1.25 times the determined frequency applied for laying the at least two rectilinear portions.

13. A method of fabricating an antenna support according to claim 9, wherein the at least two rectilinear portions are spaced apart from one another at a gap of not less than the diameter of the wire.

* * * * *